UNITED STATES PATENT OFFICE.

JOHN W. BARTLETT, OF MOLINE, ILLINOIS, ASSIGNOR TO HIMSELF AND MERVEN WITHERELL, OF SAME PLACE.

IMPROVEMENT IN LUBRICATING COMPOUNDS.

Specification forming part of Letters Patent No. 183,106, dated October 10, 1876; application filed September 16, 1876.

*To all whom it may concern:*

Be it known that I, JOHN W. BARTLETT, of Moline, in the county of Rock Island and State of Illinois, have invented a new and useful Improvement in Fire-Proof Lubricating Compound, of which the following is a specification:

The object of this invention is to furnish an improved lubricating compound for car-axles and other journals and friction-surfaces, which will not take fire from a hot journal, will keep the journal cool, will be very durable, and will be inexpensive in its preparation.

The invention consists in a fire-proof lubricating compound formed of pulverized blue-stone, oil-rock, carbonate of potash, chloride of lime, American soap-stone, concentrated lye, golden machine-oil, pure lard-oil, salt, tartaric acid, and soft water, in the proportions and manner hereinafter fully described.

In preparing my improved lubricator I take three pounds of pulverized blue-stone, one pound of oil-rock, eight ounces of carbonate of potash, one pound of chloride of lime, twelve ounces of American soap-stone, and two pounds of concentrated lye. These ingredients I put into ten gallons of soft water, boil for one hour, pour the mixture into an empty barrel, add forty gallons of soft water, and thoroughly stir it. To every five quarts of this mixture I add four quarts of golden machine-oil and six ounces of pure lard-oil, and stir it thoroughly. I then add as much salt and tartaric acid as it will bear.

Having thus described my invention, I claim as new and desire to secure by Letters Patent—

An improved fire-proof lubricating compound, formed of pulverized blue-stone, oil-rock, carbonate of potash, chloride of lime, American soap-stone, concentrated lye, golden machine-oil, pure lard-oil, salt, tartaric acid, and soft water, in the proportions and manner substantially as herein set forth.

JOHN W. BARTLETT.

Witnesses:
JOHN W. WELLS,
JOHN D. SCOTT.